US012770968B2

(12) United States Patent
Park

(10) Patent No.: US 12,770,968 B2
(45) Date of Patent: Oct. 20, 2026

(54) BATTERY PACK INCLUDING RING TERMINAL CONFIGURED TO BE COUPLED IRRESPECTIVE OF ORIENTATION

(71) Applicant: LG ENERGY SOLUTION, LTD., Seoul (KR)

(72) Inventor: Hyeong Min Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 846 days.

(21) Appl. No.: 17/775,785

(22) PCT Filed: Jan. 8, 2021

(86) PCT No.: PCT/KR2021/000272

§ 371 (c)(1),
(2) Date: May 10, 2022

(87) PCT Pub. No.: WO2021/149953

PCT Pub. Date: Jul. 29, 2021

(65) Prior Publication Data

US 2022/0384900 A1 Dec. 1, 2022

(30) Foreign Application Priority Data

Jan. 23, 2020 (KR) ........................ 10-2020-0009225

(51) Int. Cl.
*H01M 50/296* (2021.01)
*H01M 50/262* (2021.01)
*H01M 50/505* (2021.01)

(52) U.S. Cl.
CPC ....... *H01M 50/296* (2021.01); *H01M 50/262* (2021.01); *H01M 50/505* (2021.01)

(58) Field of Classification Search
CPC ............. H01M 50/296; H01M 50/262; H01M 50/505; H01M 50/503; H01M 50/298;
(Continued)

(56) References Cited

U.S. PATENT DOCUMENTS 5,643,693 A * 7/1997 Hill ..................... H01M 50/296
429/123
5,645,448 A * 7/1997 Hill ..................... H01H 85/205
439/522

(Continued)

FOREIGN PATENT DOCUMENTS

CN 109004166 A 12/2018
CN 208570825 U 3/2019

(Continued)

OTHER PUBLICATIONS

Moon (KR 19980048916 U)—English machine translation (Year: 1998).*

(Continued)

*Primary Examiner* — Jessie Walls-Murray
(74) *Attorney, Agent, or Firm* — Birch, Stewart, Kolasch & Birch, LLP

(57) ABSTRACT

Discussed is a battery pack including a plurality of battery cells coupled to a busbar plate and a battery pack case configured to receive the plurality of battery cells, wherein an external coupling portion of the busbar plate is disposed at the outer surface of the battery pack case so as to be exposed therefrom, and the external coupling portion is coupled to a ring terminal by fastening using a rivet without being deformed. The external coupling portion of the busbar plate is formed so as to be short such that opposite surfaces of the ring terminal can be coupled to the busbar plate.

16 Claims, 7 Drawing Sheets

(58) Field of Classification Search
CPC ............. H01M 50/502; H01M 50/517; H01M 50/569; H01M 50/567; H01R 11/12; H01R 4/06; H01R 13/405
See application file for complete search history.

(56) References Cited

U.S. PATENT DOCUMENTS

| | | | | |
|---|---|---|---|---|
| 6,275,003 | B1 * | 8/2001 | Marukawa | H01M 50/517 320/116 |
| 9,246,146 | B2 * | 1/2016 | Kim | H01M 50/271 |
| 10,141,148 | B2 * | 11/2018 | Onoda | H01H 85/2045 |
| 2011/0111649 | A1 * | 5/2011 | Garascia | H01M 10/4257 337/414 |
| 2014/0265671 | A1 | 9/2014 | Bradfield | |
| 2015/0023392 | A1 | 1/2015 | Noh | |
| 2015/0207117 | A1 * | 7/2015 | Cho | H01M 50/262 429/99 |
| 2015/0372354 | A1 | 12/2015 | Nakano et al. | |
| 2016/0197330 | A1 * | 7/2016 | Takase | H01M 50/209 429/92 |
| 2018/0175535 | A1 | 6/2018 | Sato et al. | |
| 2018/0317334 | A1 * | 11/2018 | Grotz | H01B 5/02 |
| 2018/0358601 | A1 | 12/2018 | Yanagihara et al. | |
| 2020/0035979 | A1 * | 1/2020 | Yamamoto | H01G 9/26 |
| 2020/0147673 | A1 | 5/2020 | Rodenburg et al. | |
| 2020/0168866 | A1 * | 5/2020 | Sakagami | H01M 50/249 |
| 2022/0013871 | A1 * | 1/2022 | Matsumura | G01R 1/04 |

FOREIGN PATENT DOCUMENTS

| | | | |
|---|---|---|---|
| JP | 2011-34883 | A | 2/2011 |
| JP | 2013-143214 | A | 7/2013 |
| KR | 20-1998-048916 | U | 10/1998 |
| KR | 20-0132937 | Y1 | 12/1998 |
| KR | 10-2015-0010225 | A | 1/2015 |
| KR | 10-2015-0127975 | A | 11/2015 |
| KR | 10-2017-0027546 | A | 3/2017 |
| KR | 10-2017-0034572 | A | 3/2017 |
| KR | 10-2019-0100278 | A | 8/2019 |
| WO | WO 2014/122905 | A1 | 8/2014 |
| WO | WO 2019/004296 | A1 | 1/2019 |

OTHER PUBLICATIONS

Extended European Search Report for European Application No. 21744445.4, dated Nov. 14, 2022.

International Search Report for PCT/KR2021/000272 mailed on Apr. 19, 2021.

* cited by examiner

【FIG. 1】 CONVENTIONAL ART
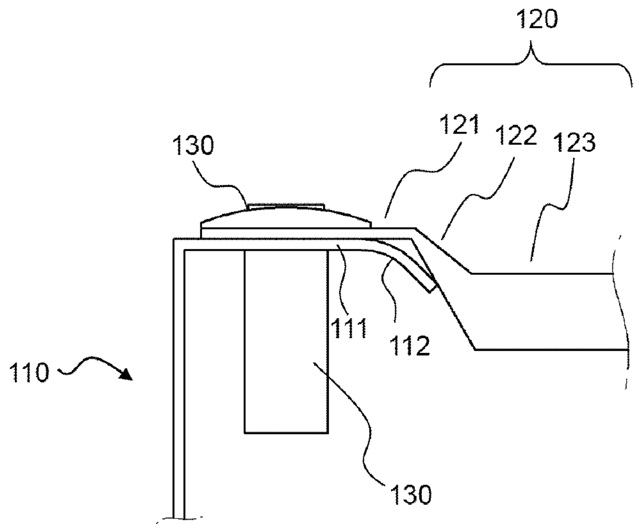

【FIG. 2】 CONVENTIONAL ART
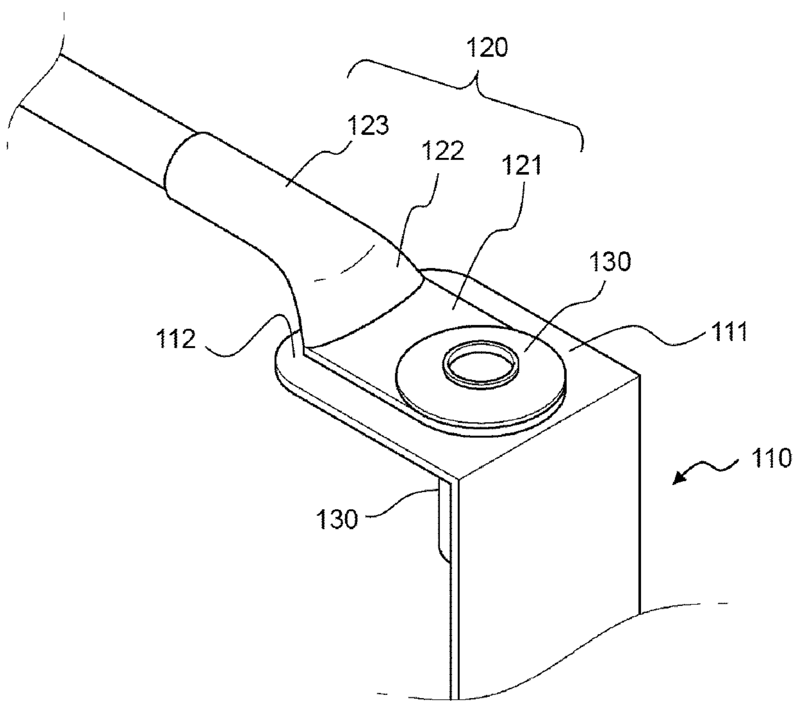

【FIG. 3】
200
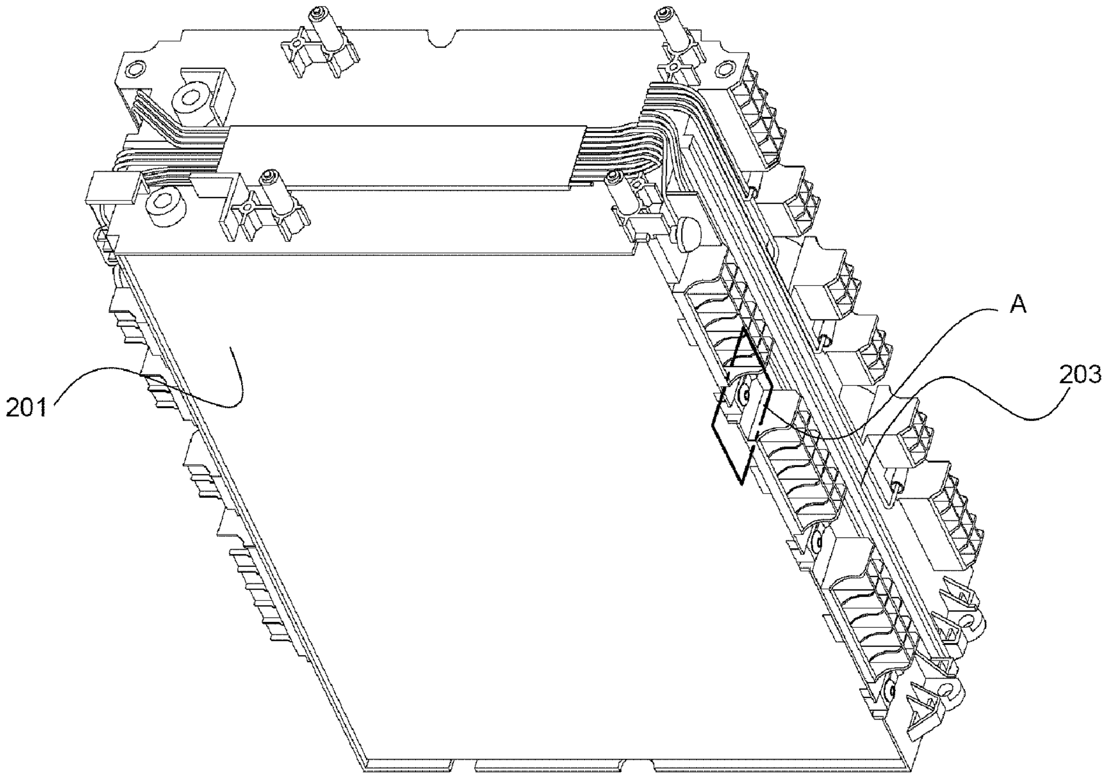

【FIG. 4】
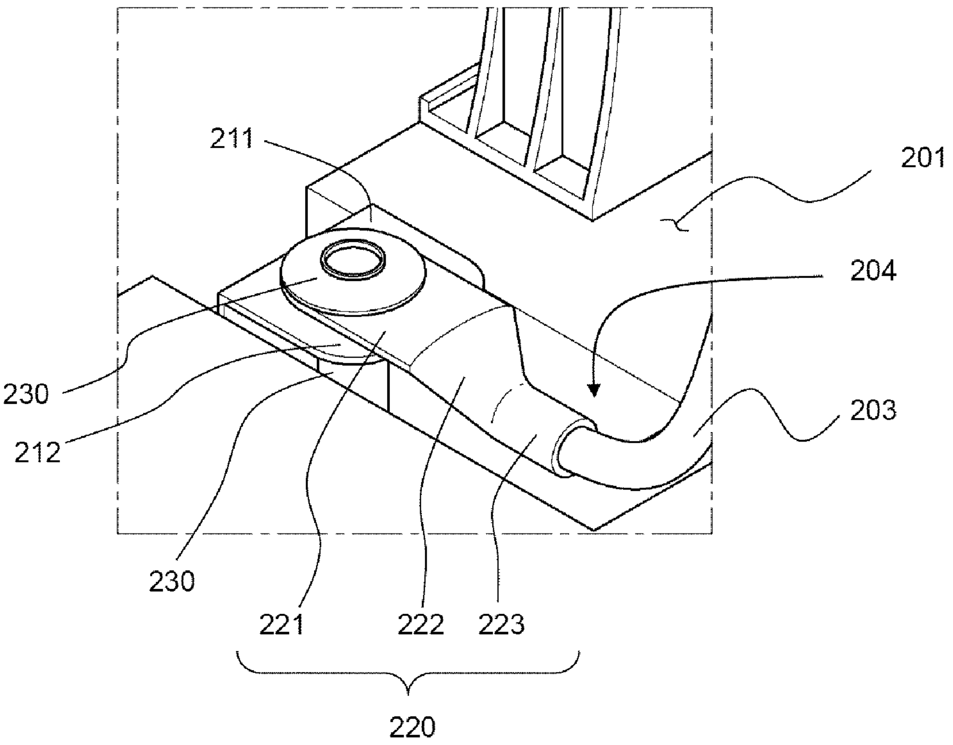

【FIG. 5】
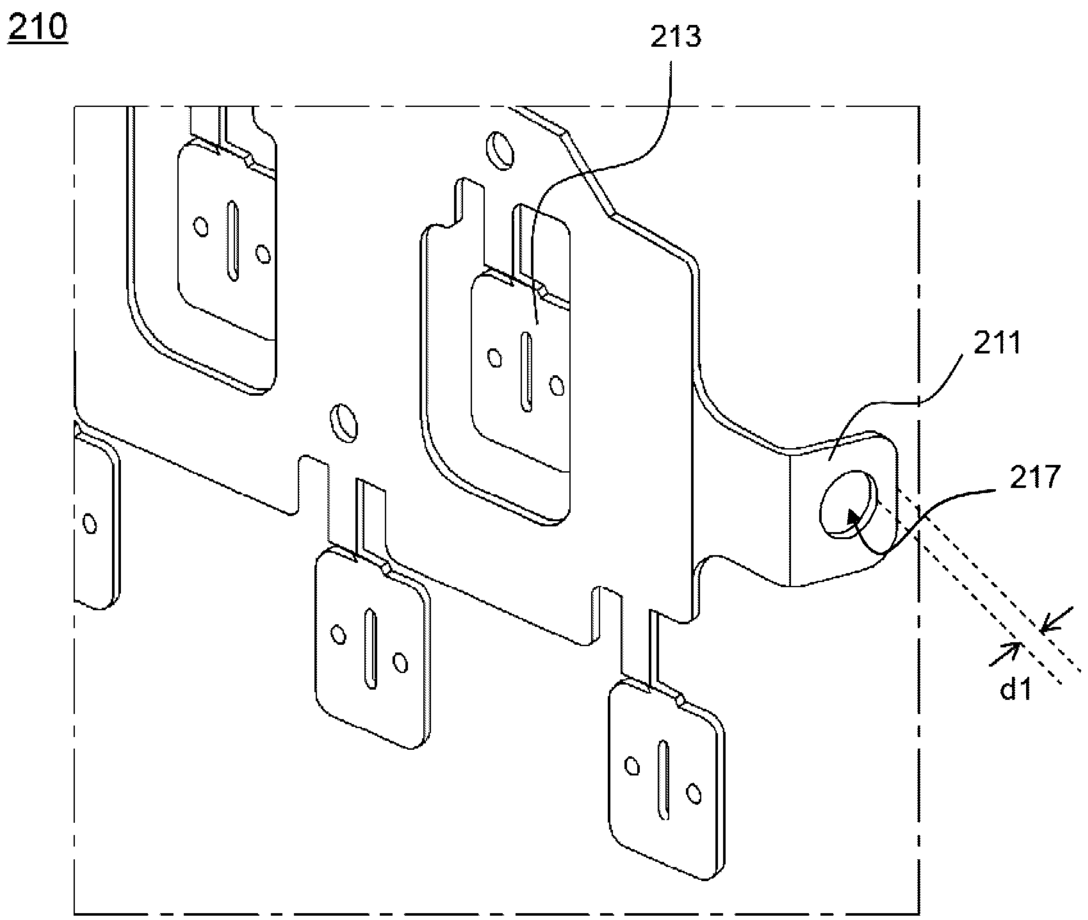

【FIG. 6】
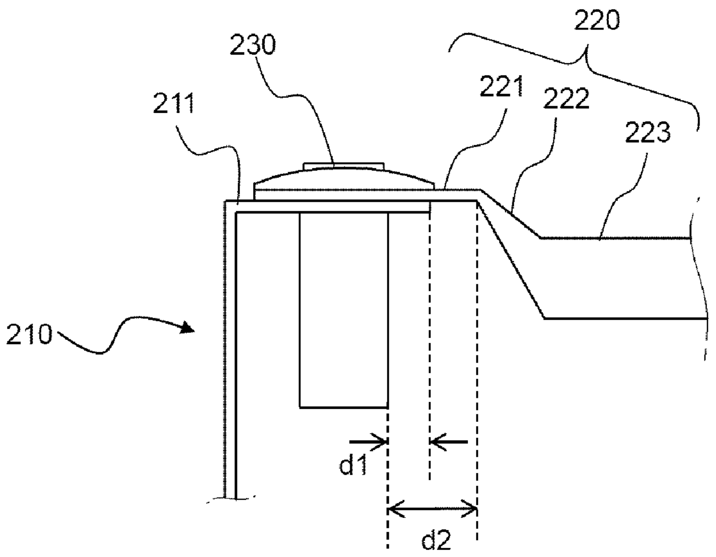

【FIG. 7】
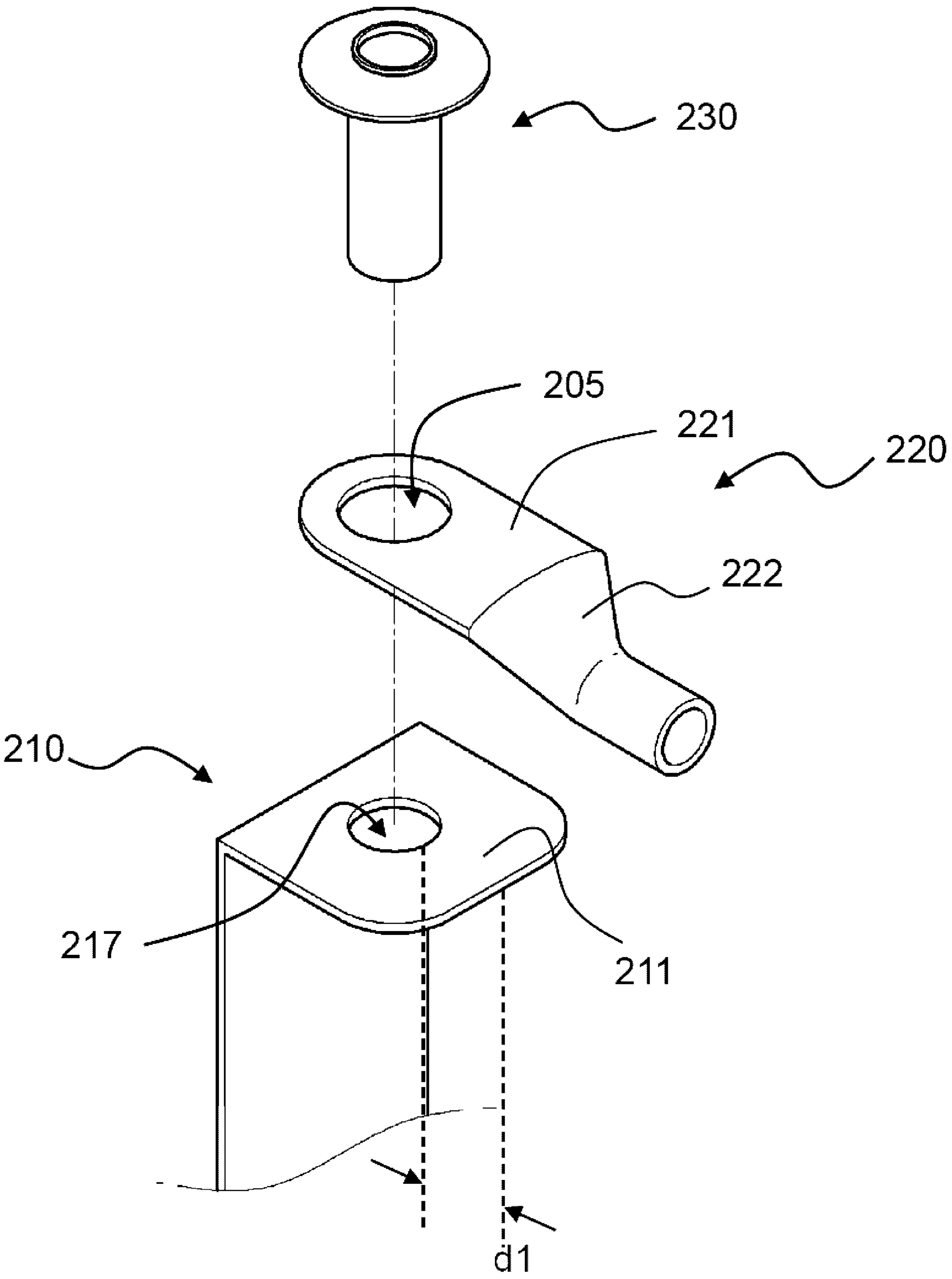

BATTERY PACK INCLUDING RING TERMINAL CONFIGURED TO BE COUPLED IRRESPECTIVE OF ORIENTATION

TECHNICAL FIELD

This application claims the benefit of priority to Korean Patent Application No. 2020-0009225 filed on Jan. 23, 2020, the disclosure of which is incorporated herein by reference in its entirety.

The present invention relates to a battery pack including a ring terminal configured to be coupled irrespective of orientation, and more particularly to a battery pack configured such that a busbar plate coupled to a plurality of battery cells and a ring terminal having a wire connected thereto can be coupled to each other by riveting irrespective of orientation of the ring terminal.

BACKGROUND ART

With an increase in energy density of a lithium secondary battery and improvement in lifespan characteristics of the lithium secondary battery, demand for a battery pack including the lithium secondary battery has increased.

As a result, not only a battery pack for small-sized electronic products but also a battery pack for electric vehicles and power storage systems that require high-output, high-capacity energy sources has been developed and used.

In general, the output and capacity of a battery pack are set by connecting a plurality of battery cells to each other in series and/or in parallel, and the battery pack includes components configured to determine whether the plurality of battery cells is normally operated and to control operation of the plurality of battery cells, such as a sensor and a battery management system (BMS).

In order to measure voltages, currents, and resistances of a plurality of battery cells, the battery cells or battery modules may be electrically connected to each other. Specifically, a wire connected to a sensing member may be coupled to one end of a busbar plate configured to electrically connect the plurality of battery cells to each other.

The wire may be coupled to the busbar plate in the state of being connected to a ring terminal. Coupling may be performed using a rivet as a method of shortening the coupling process time and securing high coupling force.

In connection therewith, FIG. 1 is a side view showing the state in which a conventional ring terminal according to a first embodiment and a busbar plate are coupled to each other.

Referring to FIG. 1, the ring terminal 120 is pressed in the state of receiving a wire such that the ring terminal and the wire are electrically connected to each other. Due to the thickness of a space configured to receive the wire, a pressing portion 123 configured to press the wire is formed so as to protrude downwards from a ring portion 121, to which a rivet 130 is coupled, as shown in the figure.

The end 112 of an external coupling portion of a busbar plate 110 is pressed by a connection portion 122 located between the ring portion 121 and the pressing portion 123, the connection portion protruding downwards. As a result, the end 112 of the external coupling portion is deformed so as to be bent downwards.

In this case, the contact area between the external coupling portion and the ring portion of the ring terminal may be reduced, whereby poor fastening may be caused.

Meanwhile, FIG. 2 is a side view showing the state in which a conventional ring terminal according to a second embodiment and the busbar plate are coupled to each other.

Referring to FIG. 2, the ring terminal of FIG. 2 may be the same as the ring terminal of FIG. 1. The pressing portion 123 of FIG. 1, which protrudes downwards, is turned upside down so as to protrude upwards, and is then coupled to the external coupling portion 111 of the busbar plate 110.

In order to prevent the ring terminal from pressing the end 112 of the external coupling portion of the busbar plate 110, whereby the end is bent, as shown in FIG. 1, the ring terminal may be disposed in the state in which the orientation of the ring terminal is changed, as shown in FIG. 2. In this case, it is possible to prevent the end 112 of the external coupling portion from being deformed.

That is, the ring terminal 120 must be used in the state in which the ring terminal 120 is disposed in the direction in which the pressing portion 123 protrudes upwards due to the structure of the ring terminal in which the pressing portion 123 protrudes to one side.

As described above, the orientation of the ring terminal must be considered in a process of coupling the ring terminal and the busbar plate to each other using a rivet, which may delay a manufacturing process.

In addition, the wire connected to the ring terminal coupled to the busbar plate and the pressing portion configured to press the wire may protrude from the outer surface of a battery pack case. As a result, the overall external size of a battery pack may be increased, whereby energy density of the battery pack may be decreased.

Therefore, there is a high necessity for technology capable of easily and rapidly performing wire coupling for sensing of a plurality of battery cells constituting a battery pack, thereby improving processability.

DISCLOSURE

Technical Problem

The present invention has been made in view of the above problems, and it is an object of the present invention to provide a battery pack including a ring terminal configured to be coupled irrespective of orientation, wherein a coupling portion of a busbar plate is formed so as to be short such that the busbar plate is not deformed by the ring terminal.

Technical Solution

In order to accomplish the above object, a battery pack according to the present invention includes a plurality of battery cells coupled to a busbar plate and a battery pack case configured to receive the plurality of battery cells, wherein an external coupling portion of the busbar plate is disposed at the outer surface of the battery pack case so as to be exposed therefrom, and the external coupling portion is coupled to a ring terminal by fastening using a rivet without being deformed.

The busbar plate may include terminal coupling portions configured to allow the plurality of battery cells to be coupled thereto and the external coupling portion provided with an opening, through which the rivet is inserted.

The ring terminal may include a ring portion configured to allow the rivet to be coupled thereto, a pressing portion configured to press a wire, and a connection portion configured to connect the ring portion and the pressing portion to each other, and the width of the circumference of an opening formed in the external coupling portion may be less than the shortest length from the inner diameter of the ring portion to the connection portion.

The ring terminal may be configured such that one of a first surface of the ring portion and a second surface of the ring portion, which is opposite the first surface, is coupled to the external coupling portion of the busbar plate.

The battery pack case may be provided with a punched portion having a size capable of receiving the entirety of the ring terminal coupled to the external coupling portion.

The pressing portion of the ring terminal may be inserted into the punched portion so as not to protrude more than the outer surface of the battery pack case such that the pressing portion is disposed inside the battery pack case.

Coupling surfaces of the external coupling portion and the ring terminal may be flat surfaces such that the coupling surfaces are brought into tight contact with each other.

The battery pack case may be made of an insulative material.

The rivet may be a blind rivet.

The ring terminal may be configured to have a structure in which the connection portion extends from the ring portion in the same plane or to have a structure in which a step is formed at the connection portion.

In addition, the present invention includes a device including the battery pack as an energy source.

Advantageous Effects

As is apparent from the above description, in a battery pack according to the present invention, a ring terminal is coupled to a busbar plate irrespective of orientation, whereby processability may be improved.

In addition, coupling surfaces of an external coupling portion of the busbar plate and a ring portion of the ring terminal are flat surfaces, and therefore the coupling surfaces are brought into tight contact with each other. Consequently, large contact surfaces are formed therebetween, whereby the force of coupling therebetween may be improved.

In addition, a pressing portion of the ring terminal is coupled to the busbar plate so as to be inserted into a punched portion formed in a battery pack case, and therefore the ring terminal may be configured so as not to protrude from the outer surface of the battery pack case.

In addition, the punched portion, which is configured to have a planar area greater than the planar area of the ring terminal, is formed in the portion of the battery pack case at which the ring terminal is disposed, and therefore the ring terminal may be received in the battery pack case.

DESCRIPTION OF DRAWINGS

FIG. 1 is a side view showing the state in which a conventional ring terminal according to a first embodiment and a busbar plate are coupled to each other.

FIG. 2 is a side view showing the state in which a conventional ring terminal according to a second embodiment and the busbar plate are coupled to each other.

FIG. 3 is a perspective view of a battery pack according to the present invention.

FIG. 4 is a partial enlarged view of part A of FIG. 3.

FIG. 5 is a partial perspective view of a busbar plate according to the present invention.

FIG. 6 is a side view showing the state in which a ring terminal according to the present invention and the busbar plate are coupled to each other.

FIG. 7 is an exploded perspective view of FIG. 6.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, the defined matters described in dependent claims are applicable to all embodiments described in this specification.

Embodiments of the present invention will be described in detail with reference to the accompanying drawings.

FIG. 3 is a perspective view of a battery pack according to the present invention, and FIG. 4 is a partial enlarged view of part A of FIG. 3.

Referring to FIGS. 3 and 4, the battery pack 200 according to the present invention receives a plurality of battery cells in a battery pack case 201, and the plurality of battery cells may be cylindrical battery cells or pouch-shaped battery cells. The plurality of battery cells is electrically.

The plurality of battery cells is electrically connected to each other via a busbar plate so as to be connected in series and/or in parallel in consideration of the capacity and output of the battery pack.

A ring terminal 220 is coupled to an external coupling portion 211 of the busbar plate using a rivet 230. The ring terminal 220 includes a ring portion 221 configured to allow the rivet 230 to be coupled thereto via an opening 205 formed in the ring portion 221, a pressing portion 223 configured to press a wire 203, and a connection portion 222 configured to connect the ring portion 221 and the pressing portion 223 to each other.

The ring terminal 220 is configured to have a structure in which a step is formed at the connection portion 222. Alternatively, the connection portion may extend from the ring portion in the same plane.

However, the pressing portion of the ring terminal, which presses the wire, is formed so as to have a thickness greater than the thickness of the ring portion in vertical section, since the pressing portion receives a thick wire, and includes a portion further protruding from the flat surface of the ring portion to one side.

The ring terminal of FIG. 4 includes a pressing portion including a portion protruding downwards from the same plane as the lower surface of the ring portion and in addition includes a connection portion having a downwardly inclined structure. However, the shape of the external coupling portion 211 of the busbar plate is different from the shape of the conventional external coupling portion shown in FIG. 2.

Specifically, since the end 212 of the external coupling portion does not reach the connection portion 222 of the ring terminal, the end of the external coupling portion does not interfere with the connection portion 222 and the pressing portion 223, which protrude downwards. Even in the case in which the pressing portion protruding downwards toward the battery pack case is included, therefore, the ring terminal may be stably coupled to the external coupling portion 211 of the busbar plate.

Alternatively, the ring terminal may be coupled to the external coupling portion in the state in which the ring terminal is disposed in the direction in which the pressing portion protrudes upwards, which is the direction opposite the battery pack case, as in the conventional method shown in FIG. 2.

In the present invention, as described above, the direction in which the ring terminal is coupled to the external coupling portion is not limited to a specific direction, whereby it is possible to rapidly perform a coupling process.

In addition, since the external coupling portion does not interfere with the ring terminal when coupled to the ring terminal, the external coupling portion is maintained flat without being bent. The coupling surface therebetween is a flat surface, and therefore the external coupling portion and the ring terminal may be disposed in tight contact with each other. Consequently, a large coupling surface is secured, whereby poor coupling and fastening therebetween does not occur.

The connection between the ring terminal and the external coupling portion of the busbar plate is performed using the rivet. In the case in which the rivet is used, the weight of the coupled members may be reduced, rapid coupling may be performed, and stable fixing may be achieved, compared to the case in which a bolt and a nut are used.

The kind of the rivet is not particularly restricted as long as it is possible to secure the force of coupling between the ring terminal and the busbar plate and to improve workability. Preferably, a blind rivet is used.

A punched portion 204 having a size capable of receiving the entirety of the ring terminal 220 coupled to the external coupling portion 211 is formed in the battery pack case 201. The pressing portion 223 of the ring terminal 220 may be inserted into the punched portion 204 so as not to protrude more than the outer surface of the battery pack case 201, and therefore the pressing portion may be disposed inside the battery pack case 201.

Consequently, it is possible to prevent the wire from being damaged by external impact as the result of the wire protruding more than the outer surface of the battery pack case.

Also, in the case in which the battery pack is configured to have a structure in which components are seated on the upper end of the coupling portion of the ring terminal, conventionally, it is necessary to provide a space capable of receiving the portion of the ring terminal protruding more than the outer surface of the battery pack case at the outside of the battery pack case in consideration of the protruding portion. In the present invention, however, it is not necessary to form a separate receiving space, since the wire is inserted into the punched portion 204, whereby design may be simplified and processing cost necessary to form the receiving space may be reduced.

In addition, the size of the battery pack case may be reduced, whereby energy density of the battery pack may be increased.

FIG. 5 is a partial perspective view of the busbar plate according to the present invention.

The busbar plate 210 is connected to a plurality of battery cells via terminal coupling portions 213, and the rivet is fastened to an opening 217 formed in the external coupling portion 211, whereby the busbar plate is coupled to the ring terminal connected to the wire. Consequently, electric conduction may be performed between the plurality of battery cells and the ring terminal.

Each of the terminal coupling portions 213 may be formed so as to have any of various shapes in order to connect a plurality of cylindrical battery cells to each other in series and/or in parallel, thereby achieving electrical connection therebetween. The shape of each of the terminal coupling portions is not limited to the shape shown in FIG. 5.

In addition, the external coupling portion is disposed at the outer surface of the battery pack case so as to be exposed therefrom. The external coupling portion of the busbar plate may be brought into contact with the battery pack case. Consequently, it is preferable that the battery pack case according to the present invention be made of an insulative material.

For example, the battery pack case may be made of a plastic material, such as polycarbonate or acrylonitrile butadiene styrene (ABS) resin.

FIG. 6 is a side view showing the state in which the ring terminal according to the present invention and the busbar plate are coupled to each other, and FIG. 7 is an exploded perspective view of FIG. 6.

Referring to FIGS. 6 and 7, there is shown the state in which the rivet 230 is fastened to the external coupling portion 211 of the busbar plate 210, whereby the busbar plate 210 and the external coupling portion 211 are coupled to each other.

The external coupling portion 211 is provided with an opening 217, though which the rivet 230 is inserted. The width d1 of the circumference (or an area at the periphery) of the opening 217 is formed so as to be less than the shortest length d2 from the inner diameter of the ring portion to the connection portion 222.

The opening may generally be formed so as to be circular, and the planar shape of the external coupling portion may be a circular shape or an oval shape, or the corners of the external coupling portion may be round or polygonal. The width d1 of the circumference of the opening may not be uniform depending on the planar shape of the external coupling portion. Consequently, the width d1 of the circumference of the opening means the largest length from the circumference of the opening to the outer periphery of the external coupling portion.

The planar shape of the ring portion may also be a circular shape or an oval shape, or the corners of the ring portion may be round or polygonal. The shortest length d2 from the inner diameter of the ring portion to the connection portion means the shortest length from the circumference of the opening formed in the ring portion to the connection portion.

In addition, when the width d1 of the circumference of the opening is formed so as to be less than the shortest length d2 from the inner diameter of the ring portion to the connection portion, the thickness of the external coupling portion and the thickness of the ring terminal may be considered.

Even in the case in which a ring terminal having a structure in which the connection portion extends from the ring portion in the same plane, rather than the structure of the ring terminal shown in FIG. 6, is used, the width d1 of the circumference of the opening is formed so as to be less than the shortest length d2 from the inner diameter of the ring portion to the connection portion 222 in the same manner.

Even in the case in which the connection portion and the pressing portion protrude downwards from the flat surface of the ring portion, therefore, there is no interference between the connection portion and the pressing portion and the external coupling portion of the busbar plate, whereby coupling using the rivet is stably performed.

The present invention includes a device including the battery pack as an energy source. The device may be a wearable electronic device, a wireless cleaner, a robot cleaner, a two-wheeled vehicle, an electric tool, an electric means of transportation, an electric vehicle, a hybrid electric vehicle, or a power storage system.

Those skilled in the art to which the present invention pertains will appreciate that various applications and modifications are possible within the category of the present invention based on the above description.

DESCRIPTION OF REFERENCE SYMBOLS

110, 210: Busbar plates
111, 211: External coupling portions
112, 212: Ends of external coupling portions
120, 220: Ring terminals
121, 221: Ring portions
122, 222: Connection portions
123, 223: Pressing portions
130, 230: Rivets
200: Battery pack
201: Battery pack case
203: Wire
204: Punched portion
205, 217: Openings
213: Terminal coupling portion
d1: Width of circumference of opening
d2: Shortest length from inner diameter of ring portion to connection portion

INDUSTRIAL APPLICABILITY

As is apparent from the above description, in a battery pack according to the present invention, a ring terminal is coupled to a busbar plate irrespective of orientation, whereby processability may be improved.

In addition, coupling surfaces of an external coupling portion of the busbar plate and a ring portion of the ring terminal are flat surfaces, and therefore the coupling surfaces are brought into tight contact with each other. Consequently, large contact surfaces are formed therebetween, whereby the force of coupling therebetween may be improved.

In addition, a pressing portion of the ring terminal is coupled to the busbar plate so as to be inserted into a punched portion formed in a battery pack case, and therefore the ring terminal may be configured so as not to protrude from the outer surface of the battery pack case.

In addition, the punched portion, which is configured to have a planar area greater than the planar area of the ring terminal, is formed in the portion of the battery pack case at which the ring terminal is disposed, and therefore the ring terminal may be received in the battery pack case.

The invention claimed is:

1. A battery pack comprising:
a plurality of battery cells coupled to a busbar plate; and
a battery pack case configured to receive the plurality of battery cells,
wherein an external coupling portion of the busbar plate is disposed at an outer surface of the battery pack case so as to be exposed therefrom,
wherein the battery pack case is provided with a punched portion directly formed and recessed in the battery pack case, and the punched portion having an exposed portion that is recessed and receiving an entirety of a ring terminal coupled to the external coupling portion, and
wherein terminal coupling portions of the busbar plate are coupled to the plurality of battery cells, and the external coupling portion of the busbar plate is coupled to the ring terminal on the outer surface of the battery pack case by fastening using a rivet without being deformed,
wherein the ring terminal comprises:
a ring portion configured to allow the rivet to be coupled thereto;
a pressing portion configured to press a wire; and
a connection portion configured to connect the ring portion and the pressing portion to each other,
wherein a width of an area at a periphery of an opening formed in the external coupling portion is less than a shortest length from an inner diameter of the ring portion to the connection portion,
wherein the connection portion has a downwardly inclined structure or a stepped structure, and
wherein the ring portion and the pressing portion are substantially parallel.

2. The battery pack according to claim 1, wherein the busbar plate comprises:
the terminal coupling portions configured to allow the plurality of battery cells to be coupled thereto; and
the external coupling portion provided with the opening, through which the rivet is inserted.

3. The battery pack according to claim 1, wherein the ring terminal is configured such that one of a first surface of the ring portion and a second surface of the ring portion, which is opposite the first surface, is coupled to the external coupling portion of the busbar plate.

4. The battery pack according to claim 1, wherein the pressing portion of the ring terminal is inserted into the punched portion so as not to protrude more than the outer surface of the battery pack case such that the pressing portion is disposed inside the battery pack case.

5. The battery pack according to claim 1, wherein coupling surfaces of the external coupling portion and the ring terminal are flat surfaces such that the coupling surfaces are brought into tight contact with each other.

6. The battery pack according to claim 1, wherein the battery pack case is made of an insulative material.

7. The battery pack according to claim 1, wherein the rivet is a blind rivet.

8. A device comprising the battery pack according to claim 1 as an energy source.

9. The battery pack according to claim 1, wherein a distance from the connection portion to the rivet is the same or greater than a distance from the connection portion to the external coupling portion.

10. The battery pack according to claim 1, wherein the external coupling portion is not deformed when the external coupling portion is entirely parallel with the ring portion.

11. The battery pack according to claim 1, wherein the external coupling portion does not physically contact the connection portion.

12. The battery pack according to claim 1, wherein a distal end of the busbar plate that is distal from the external coupling portion of the busbar plate is bent downwards, and is inserted into the punched portion.

13. The battery pack according to claim 1, wherein the exposed portion has a length that is greater than lengths of the pressing portion and the connection portion.

14. The battery pack according to claim 1, wherein a circumference of the rivet and an end of the external coupling portion are substantially flush.

15. The battery pack according to claim 14, wherein the circumference of the rivet and an outer circumference of the ring portion are substantially flush.

16. The battery pack according to claim 15, wherein a location of the end of the external coupling portion and a location of the outer circumference of the ring portion are on opposite points on the circumference of the rivet.

* * * * *